(12) United States Patent
Kanai et al.

(10) Patent No.: US 7,453,222 B2
(45) Date of Patent: Nov. 18, 2008

(54) SUN ROOF DRIVE DEVICE (75) Inventors: Takashi Kanai, Ueda (JP); Takahiro Maruyama, Ueda (JP); Yutaka Nagai, Ueda (JP); Munehiro Kawai, Ueda (JP); Yoshikazu Ito, Sakura (JP)

(73) Assignees: Shinano Kenshi Kabushiki Kaisha, Ueda (JP); Yachiyo Kogyo Kabushiki Kaisha, Sayama (JP)

( * ) Notice: Subject to any disclaimer, the term of this patent is extended or adjusted under 35 U.S.C. 154(b) by 134 days.

(21) Appl. No.: 10/588,752

(22) PCT Filed: Feb. 4, 2005

(86) PCT No.: PCT/JP2005/001667

§ 371 (c)(1),
(2), (4) Date: Aug. 8, 2006

(87) PCT Pub. No.: WO2005/076457

PCT Pub. Date: Aug. 18, 2005

(65) Prior Publication Data
US 2007/0182218 A1 Aug. 9, 2007

(30) Foreign Application Priority Data
Feb. 9, 2004 (JP) ............................. 2004-032276

(51) Int. Cl.
*H02P 7/00* (2006.01)

(52) U.S. Cl. .................. 318/432; 318/15; 318/280; 318/282; 318/445

(58) Field of Classification Search ............. 318/432, 318/15, 280, 282, 445, 465, 434; 296/76
See application file for complete search history.

(56) References Cited

U.S. PATENT DOCUMENTS

| 4,857,812 | A  | * | 8/1989 | Mochizuki et al. ............ 318/15 |
| 5,031,949 | A  | * | 7/1991 | Sorimachi et al. ............ 296/76 |
| 6,183,040 | B1 | * | 2/2001 | Imaizumi et al. ............ 296/155 |
| 2002/0117938 | A1 | * | 8/2002 | Foster et al. ............ 310/313 D |

FOREIGN PATENT DOCUMENTS

| JP | 5-38183 A | 2/1993 |
| JP | 2001-30763 A | 2/2001 |
| JP | 2001-180823 A | 7/2001 |
| JP | 2001-517178 A | 10/2001 |
| JP | 2002-89133 A | 3/2002 |
| JP | 2003-111481 A | 4/2003 |
| JP | 2003-299294 A | 10/2003 |
| WO | WO-99/34995 A1 | 7/1999 |

* cited by examiner

*Primary Examiner*—Karen Masih
(74) *Attorney, Agent, or Firm*—Birch, Stewart, Kolasch & Birch, LLP (57) ABSTRACT The sun roof drive device opens and closes a vehicle sun roof by a DC brushless motor, which is driven by rectangular waves when high torque is required at a low rotational speed and which is driven by sinusoidal waves or pseudo-sinusoidal waves when low noise is required.

8 Claims, 7 Drawing Sheets

SECTION TAKEN ALONG LINE A—A

FIG.3C

SECTION TAKEN ALONG LINE B—B

SUN ROOF DRIVE DEVICE

FIELD OF TECHNOLOGY

The present invention relates to a sun roof drive device of a vehicle.

BACKGROUND TECHNOLOGY

A sun roof unit includes a slide panel, which is attached in an opening of a fixed roof of a vehicle and can be moved backward and forward by a push-pull cable and whose rear end can be tilted in the vertical direction. The push-pull cable is pushed and pulled by rotating a motor, which has a speed reduction unit, in the opposite directions, so that the slide panel can be opened and closed. A DC brush motor is mainly used as a drive source.

Conventional control devices for opening and closing a slide panel will be explained. For example, absolute positions of a sun roof and rotational directions of a motor are detected by a pair of rotation number sensors, which detect rotation number of the motor, and means for detecting a position of the slide panel with respect to a reference position (see Japanese Patent Gazette No. 2002-89133); Output pulses of Hall ICs are divided into pulses for tilting action and pulsed for sliding actions, and they are respectively counted by a first counter and a second counter (see Japanese Patent Gazette No. 2001-180283); and rotational number of a motor shaft and rotational number of an output shaft, which engages with the motor shaft, are respectively detected, and rotational number of a motor is counted on the basis of edges of output shaft detection signals (see Japanese Patent Gazette No. 2001-30763).

In each of the above described technologies for controlling the sun roof, a rectifier (commutator) and a DC brush motor are used, and the sun roof is moved above a head of a driver, etc., so loud sliding noises are created between the commutator and a brush when the motor is driven. Therefore, reducing the noises, which are created when the sun roof is opened and closed, is required.

A plurality of independent sensors for detecting rotational number of the motor and positions of the slide panel must be provided so as to control the tilting action and the sliding action, so that number of parts must be increased, production cost must be increased and complex control must be required.

If a rotor diameter (outer diameter) of the motor is great, a balance is disrupted so that vibrations of the motor are transmitted to the slide panel via a speed reduction mechanism and a push-pull cable and vibration noises are created. A sun roof drive device is provided in a narrow space of a fixed roof, so it must be small in size. Further, a low voltage source (battery), whose voltage is relatively low and which is capable of maintaining enough torque, is required.

DISCLOSURE OF THE INVENTION

The present invention has been conceived to solve the above described problems, and an object of the present invention is to provided a sun roof drive device, which includes a small and high power DC brushless motor capable of reducing noises.

To achieve the object, the sun roof drive device of the present invention has following structures. The sun roof drive device for opening and closing a vehicle sun roof comprises: a DC blushless motor acting as a drive source; a motor drive unit for switching drive voltage, which is applied to stator coils on the basis of a rotational position of a rotor detected by a magnetic sensor for detecting pole positions of a rotor magnet; a control unit controlling the opening and closing actions of the vehicle sun roof, with the motor drive unit, on the basis of a detection signal of the magnetic sensor; and a push-pull mechanism pushing and pulling a push-pull means, which is linked with the DC brushless motor by a speed reduction unit.

In the sun roof drive device, the stator coils, which are respectively wound on stator teeth, may be connected as 3-phase delta connection.

In the sun roof drive device, the motor drive unit may apply sinusoidal waves or pseudo-sinusoidal waves to the stator coils. In this case, preferably the motor drive unit drives the motor by rectangular waves when high torque is required at a low rotational speed and drives the same by sinusoidal waves or pseudo-sinusoidal waves when low noise is required.

In the sun roof drive device, a position of the vehicle sun roof may be detected on the basis of detection signals of the magnetic sensor, which correspond to three or two of three phases; and the control unit may perform arithmetic processing so as to control the position and a speed of the vehicle sun roof on the basis of a count signal, which is generated by counting rising edges and trailing edges of pulses of the pole detection signals. Further, the control unit may detect jamming of the vehicle sun roof by controlling a speed of the vehicle sun roof.

In the sun roof drive device, the DC brushless motor may be an inner rotor type motor, in which a motor shaft having the rotor magnet is capable of rotating in a space enclosed by a stator core, in which is the stator coils are respectively wound on stator pole sections.

In the sun roof drive device, the rotor magnet may be skew-magnetized or sinusoidal-magnetized in radial directions.

In the sun roof drive device, the control unit may control the action of the vehicle sun roof and generation of rotary magnetic fields of the motor by one CPU.

In the above described sun roof drive device, the DC brushless motor is used as the drive source, so that jagged operation noises of the sun roof can be made lower than that of the conventional sun roof driven by the DC brush motor.

By connecting the stator coils, which are wound on the stator teeth, as the 3-phase delta connection, enough torque for pushing and pulling the push-pull means can be gained even if the sun roof is driven by a low voltage source and diameters of the stator coils are smaller than those of the stator coils connected as a star connection, so that the small drive device capable of maintaining enough torque can be realized.

If the motor drive unit applies sinusoidal waves or pseudo-sinusoidal waves to the stator coils, noises generated by phase changes can be reduced.

If the motor drive unit drives the motor by rectangular waves when high torque is required at a low rotational speed in order to reduce noise and drives the same by sinusoidal waves or pseudo-sinusoidal waves when low noise is required, performance of the device can be changed according to situations and noised can be reduced.

If the rotor magnet is skew-magnetized or sinusoidal-magnetized in radial directions, torque ripples and cogging torque can be reduced so that vibrations of the rotating rotor can be reduced, and noises can be further reduced by applying sinusoidal waves or pseudo-sinusoidal waves.

By employing the inner rotor type DC brushless motor in which the motor shaft has the rotor magnet, a diameter of the rotor can be smaller, the balance of the rotor can be maintained and rotational vibrations of the rotor can be reduced, so that noises can be reduced and processing parts of the motor for achieving a balance can be omitted.

The position of the vehicle sun roof may be detected on the basis of detection signals of the magnetic sensor, which correspond to three or two of three phases, further the control unit may perform arithmetic processing so as to control the position and the speed of the vehicle sun roof on the basis of the count signal, which is generated by counting rising edges and trailing edges of pulses of the pole detection signals, with high resolution. With this structure, the control unit can be simplified and made smaller without using independent sensors and encoders. Since the control unit counts rising edges and trailing edges of pulses of the pole detection signals, miscount caused by reciprocating actions (e.g., chattering, cogging) which are performed when the magnetic poles are changed, instantaneous noises, etc. can be prevented.

By controlling the action of the vehicle sun roof and the generation of rotary magnetic fields of the motor with one CPU, the control unit can be simplified.

PREFERRED EMBODIMENTS OF THE INVENTION

Preferred embodiments of the sun roof drive device of the present invention will be explained with reference to the accompanying drawings. The sun roof drive devices of the embodiments can be widely applied to vehicle sun roofs driven by motors. The sun roof drive device slides a slide panel, which is connected to a geared cable (a cable having a spiral gear groove) engaged with an output gear rotated by a motor and a push-pull means, e.g., plastic belt, between a full-open position and a full-close position and tilts a rear end of the slide panel, so that an opening of a fixed roof is opened and closed. A 3-phase DC brushless motor to be described is suitably used as a drive source of the sun roof drive device.

An outline of the sun roof drive device for driving a vehicle sun roof will be explained with reference to a block diagram of FIG. 1. An electric power source 1 is a battery or a fuel cell provided in a vehicle, and source voltage (e.g., battery voltage of 12V) is applied to a power processing unit 2. The power processing unit 2 converts the source voltage (e.g., 12V) into control voltage (e.g., 5V), stabilizes the source voltage, protects against reverse connection and turns on and off the power source on the basis of external signals. A voltage monitoring unit 3 monitors the control voltage applied to a CPU (central processing unit) 4 and sends an input signal to the CPU 4 when voltage drop occurs.

The CPU 4 controls the sun roof drive device, namely it controls the action of the vehicle sun roof and phase switching so as to generate rotary magnetic fields of the motor. In the CPU 4, a roof operation control unit 5, which controls opening and closing actions of the roof 13, and a rotary magnetic field generation control unit 6, which generates rotary magnetic fields on the basis of magnetic pole detection signals sent from the motor so as to control rotation of the motor, are formed in one chip. A start signal is inputted to the CPU 4 from, for example, a switch 7 of an operation panel, then the roof operation control unit 5 actuates the rotary magnetic field generation control unit 6 so as to start the motor.

Control data, e.g., present roof position, predetermined open position and close position, speed reducing positions, rotational numbers of the motor, are written in a nonvolatile memory (e.g., EEPROM) 8, and the data can be rewritten according to need. For example, a previous position of the roof is read when the power source 1 is turned on; a new position of the roof is written in the nonvolatile memory 8 when the voltage monitoring unit 3 detects voltage drop of the source voltage. A motor drive unit 9 sends phase switching signals (drive voltage) to the 3-phase DC brushless motor 10, which acts as the drive source, via a drive circuit (3-phase bridge circuit) including switching elements, e.g., transistors, IGBTs, FETs. An electric power is supplied from a power processing unit 2 to the motor drive unit 9. The DC brushless motor 10 pushes and pulls a roof drive cable 12 (push-pull means) by a speed reduction unit 10 to be described. Therefore, a roof (slide panel) 13, which is linked with the roof drive cable 12, can be moved to open and close the opening of the fixed roof.

3-phase detection pulse signals are respectively sent from magnetic sensors or magnetic/electric converting elements (e.g., hall elements, hall ICs, MR elements), which are provided to the DC brushless motor 10, to the roof operation control unit 5 and the rotary magnetic field generation control unit 6. The roof operation control unit 5 monitors a roof speed (rotation number of the motor) and number of pulses of the phase switching signals on the basis of control programs and sends a command to the rotary magnetic field generation control unit 6 so as to renew the phase switching signals when the roof speed (rotation number of the motor) is too fast or too slow. Further, the roof operation control unit 5 generates roof position data on the basis of the 3-phase detection pulse signals.

Next, a concrete structure of the sun roof drive device will be explained with reference to FIGS. 2 and 3.

Figure 2A:
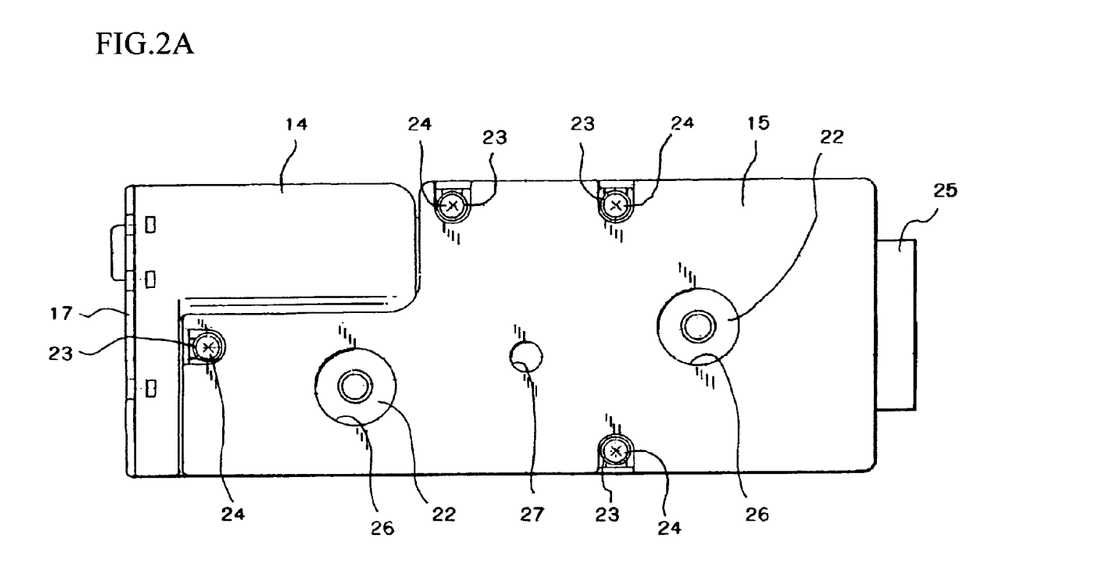
FIGS. 2A and 2B are a plan view of the sun roof drive device seen from a board case side and a front view thereof.
Figure 2B:
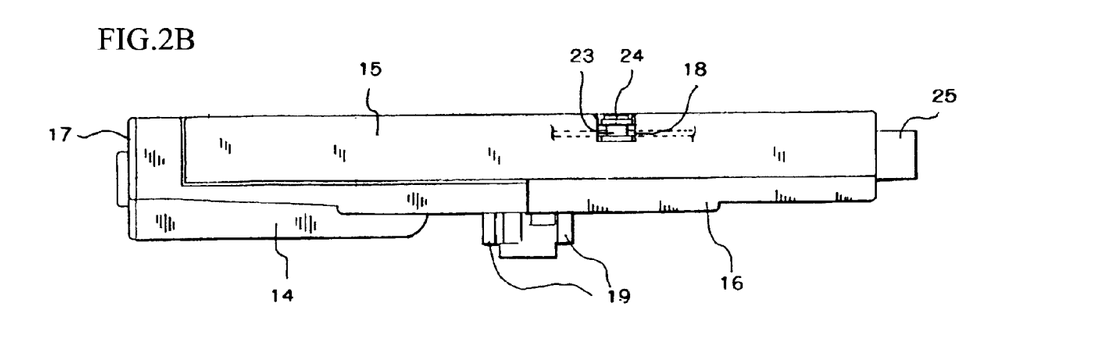

In FIGS. 2A and 2B, the sun roof drive device is constituted by a board case 15, a motor case 14 covering the board case 15 and an exterior case 16. The motor case 14 accommodates the 3-phase DC brushless motor 10 and a cable drive mechanism (push-pull mechanism), which is linked with the DC brushless motor 10 by the speed reduction unit 11 so as to push and pull the roof drive cable 12. A control board 18, on which the electronic parts, e.g., the CPU 14, the motor drive unit 9, the nonvolatile memory 18, constituting a control circuit, are mounted, is attached to the board case 15. The exterior case 16 covers the control board 18 attached to the board case 15.

The 3-phase DC brushless motor 10 is inserted in the motor case 14 and fixed in the case by fitting a lid 17. A pair of guide plates 19, which guide a movement of the roof drive cable 12, are outwardly projected from an outer surface of the motor case 14 (see FIG. 2B). In FIG. 3A, two through-holes 20 are formed in the motor case 14 along a moving route of the roof drive cable 12. In FIG. 3B, a C-shaped holder 21, which is provided to an inner face of each through-hole 20, fits in an outer face (circumferential groove) of a damper (e.g., grommet, rubber pad) 22. The dampers 22 are provided so as not to transmit rotational vibrations of the DC brushless motor 10 to a roof drive unit supporting section and the roof drive cable 12 via the motor case 14.

In FIGS. 2A and 2B, the control board 18 is sandwiched by cylindrical rubber pads (grommets) 23 and fixed on the inner face side of the board case 15, further screws 24 are respectively pierced through center holes of the rubber pads 23 and screwed with screw holes of the motor case 14 so that the control board is completely fixed. In the present embodiment, the control board 18 is fixed to the board case 15 by four rubber pads 23 and screws 24. A connector 25 is connected to the control board 18 and outwardly projected from an opening section of the board case 15. A terminal connector (not shown) of a vehicle will be electrically connected to the connector 25 when the sun roof drive device is attached in the fixed roof of the vehicle.

Through-holes 26, which correspond to the dampers 22 and an output shaft to be described, are formed in the board case 15 and the control board 18. When the sun roof drive unit is attached, screw holes of the roof drive cable 12 are corresponded to the through-holes 20 of the motor case 14. Namely, a washer is set on each damper 22 from the board case 15 side, then a screw is inserted into a center hole of each damper 22 and screwed with the screw hole, so that the sun roof drive device can be fixed and linked with the roof drive cable 12. When the sun roof drive device emergency-stops, a tool is inserted into a through-hole 27 so as to engage the tool with the output shaft from the board case 15 side and rotate an output gear, so that the roof drive cable 12 can be moved and the roof 13 can be manually opened and closed.

Next, the DC brushless motor 10 will be explained with reference to FIGS. 3 and 4.

Figure 4:
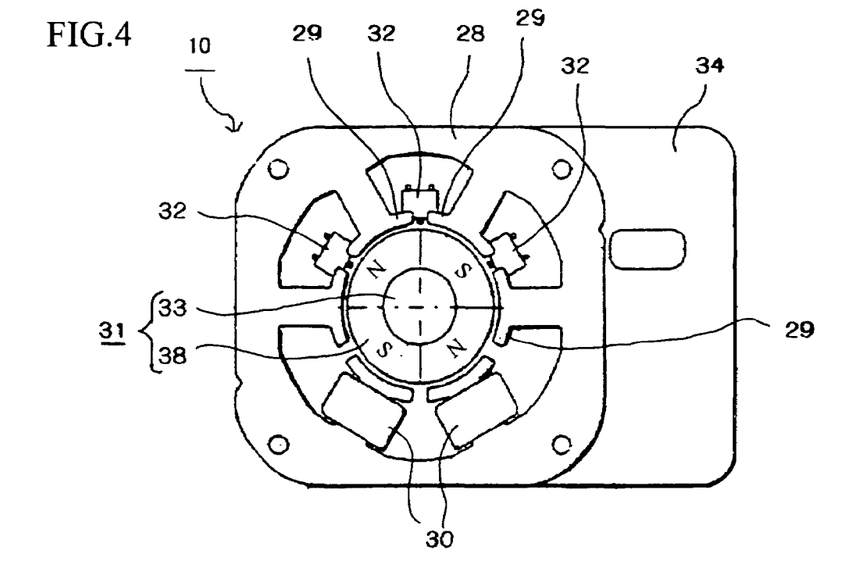
FIG. 4 is an explanation view of a 3-phase DC brushless motor.

In FIG. 4, the DC brushless motor 10 is, for example, a 4-pole/6-slot inner rotor type 3-phase DC brushless motor. A stator core 28 is, for example, a layered core having six stator teeth 29, which are radially inwardly extended. Stator coils 30 are respectively wound on the stator teeth 29. A rotor 31 is provided in a space enclosed by the stator core 28. By employing the inner rotor type motor whose rotor diameter is small, inertia and rotational vibrations of the rotor can be restrained, so that noises can be reduced and processing the rotor 31 for achieving a rotational balance can be omitted. Three magnetic sensors or magnetic/electric converting elements (e.g., hall elements, hall ICs, MR elements) 32 provided at the periphery of an outer edge of the rotor, and they face the rotor 31. Note that, the DC brushless motor 10 is not limited to the 4-pole/6-slot motor, but the above described example is suitable in view of torque reduction caused by multiple poles.

Figure 3A:
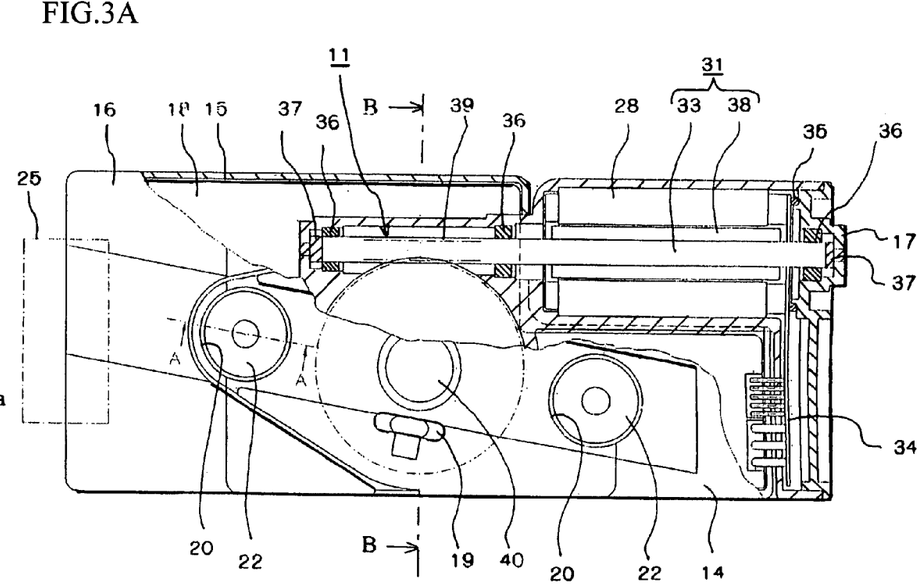
FIGS. 3A-3C are a partial cutaway view seen from a motor case side, a partial sectional view taken along a line A-A and a sectional view taken along a line B-B.
Figure 3B:
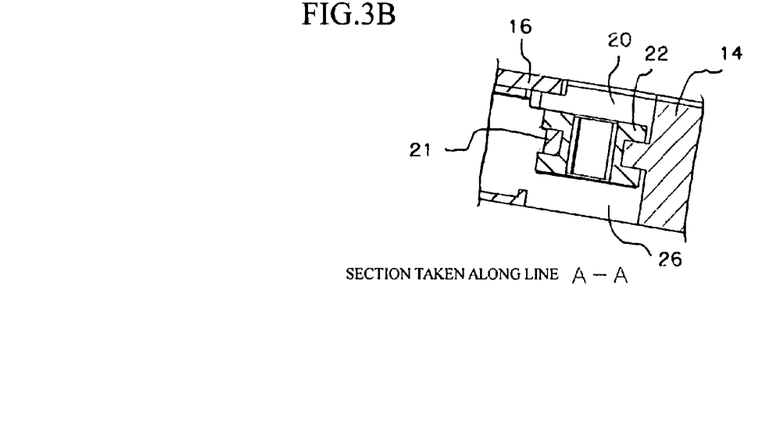

In FIG. 3A, the magnetic sensors 32 are provided to a sensor board 34, which is arranged perpendicular to a motor shaft 33. The sensor board 34 is sandwiched between an end face of the stator core 28 and the lid 17 with an elastic member 35, e.g., O-ring, so that it is fixed in the motor case 14. The sensor board 34 is electrically connected to the control circuit of the control board 18 by cables.

In FIG. 3A, the motor shaft 33 equipped with the rotor 31 is supported by three radial bearings 36, which are provided in the motor case 14 and the lid 17. Both ends of the motor shaft 33 respectively contact thrust holders 37, which are respectively provided in the motor case 14 and the lid 17. The rotor 31 is a cylindrical rotor magnet 38, which is fitted to an outer face of the motor shaft 33. In the rotor magnet 38, N-magnetic poles and S-magnetic poles are alternately formed in a circumferential direction. The rotor magnet 38 may be skew-magnetized or sinusoidal-magnetized in radial directions; in this case, torque clip and cogging of the motor are reduced, so that rotational vibrations can be reduced.

A speed reduction mechanism of the DC brushless motor 10 will explained. In FIG. 3A, the motor shaft 33 of the DC brushless motor 10 is pierced through the stator core 28, one end is radially supported by the bearing 36 in the motor case 14, and the other end is radially supported by the bearing 36 in the lid 17. A worm section 39, in which a gear groove is spirally formed, is formed in a part of the motor shaft 33 extended on the one end side.

Figure 3C:
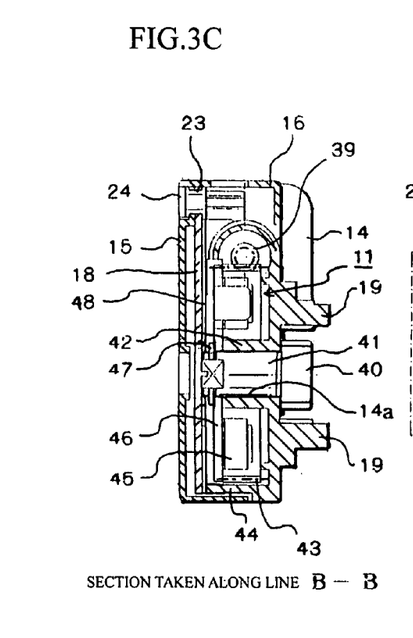

In FIG. 3C, the output shaft 41, which is integrated with the output gear (pinion gear) 40, is fitted into a shaft hole 14*a* of the motor case 14 from the outer side. A cylindrical boss 42 is inwardly extended from an edge of the shaft hole 14*a* of the motor case 14, and a shaft hole of a reduction gear (worm gear) 43 is fitted in the boss 42. The reduction gear 43 is assembled in the motor case 14, its inner circumferential face faces the boss 42, its outer circumferential face is enclosed by a gear accommodating wall 44 of the motor case 14, and the reduction gear engages with the worm section 39 of the motor shaft 33 at a specific position, at which the both perpendicularly engage. A plurality of dampers 45, which are inserted in an inner part of the reduction gear 43, are integrated with a lock plate 46. The reduction gear 43 is fitted with the boss 42, the output shaft 41 is fitted in the shaft hole 14*a*, and a C-ring 47 is attached to one end of the output shaft, which is extended from a side face of the reduction gear 43 so that the both are integrated.

The reduction gear 43, which is accommodated in the motor case 14, is covered with a shielding member (sheet-shaped member) 48, then the motor case 14 and the board case 15 are assembled. Namely, the control board 18 and the reduction gear 43 are separated by the shielding member 48 in the case. The shielding member 48 prevents grease applied to gear teeth of the reduction gear 43 from flowing toward the control board. Preferably, the shielding member 48 is a laminated sheet-shaped member, in which a cloth sheet, e.g., velvet, velour, is provided on the gear side and a plastic sheet is provided on the board side, but a unilaminar sheet may be employed. The shielding member 48 contacts an end face of the gear accommodating wall 44 so as to maintain sealing property.

When the DC brushless motor starts, the motor shaft 33 is rotated in a prescribed direction, a rotational speed is reduced by the reduction gear 43 engaged with the worm section 39, and the output shaft 41 and the output gear 40 are rotated. Therefore, the roof drive cable 12 engaged with the output gear 40 is moved (the push-pull action) so as to open and close the roof 13 (see FIG. 1).

Figure 5A:
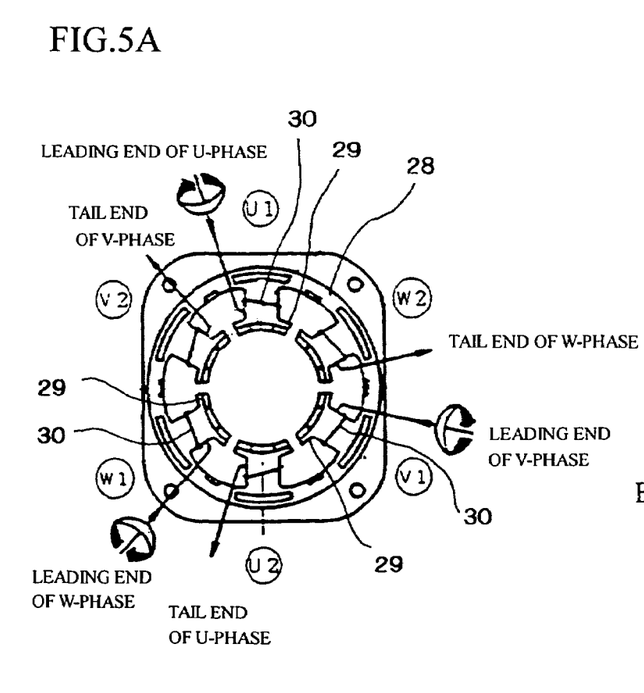
FIGS. 5A and 5B are an explanation view of delta connection of stator coils and an equivalent circuit diagram.
Figure 5B:
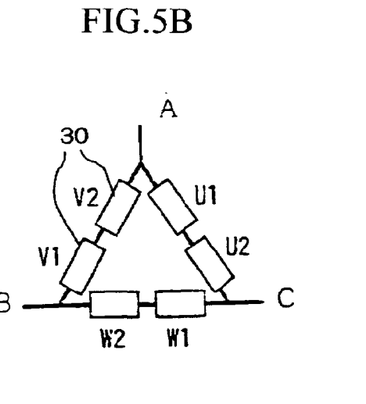

Next, a connection form and phase switching action of the motor will be explained with reference to FIGS. 5 and 6. In the 4-pole/6-slot 3-phase DC brushless motor 10 shown in FIGS. 5A and 5B, the stator coils 30 of three phases (U-phase, V-phase and W-phase) are connected as a delta connection. A leading end of a U-phase coil and a tail end of a V-phase coil (an A-terminal shown in FIG. 5B), a leading end of the V-phase coil and a tail end of a W-phase coil (a B-terminal shown in FIG. 5B) and a leading end of the W-phase coil and a tail end of the U-phase coil (a C-terminal shown in FIG. 5B) are connected as the delta connection. Each of the delta-connected phase coils 30 is twisted to form a lead wire, and the lead wire is solder-welded to the sensor board 34.

In a general 3-phase DC brushless motor, stator coils are connected as a star connection. In case of using a low voltage source (e.g., battery), which is used as a power source of a vehicle, winding number of the coils are reduced and thick coil wires are used so as to reduce resistance and increase amount of an electric current.

Since the motor for driving the sun roof is installed in a small space of the fixed roof, the motor must be small in size and maintaining enough torque is required. To maintain the torque, area of the stator teeth 29 must be increased, so distances between adjacent stator teeth 29 must be reduced as short as possible. In case of using the low voltage source, thick coil wires are employed so as to increase amount of the electric current, but the distances between the adjacent stator teeth 29 must be longer and the size of the motor must be large.

Thus, in case of using the low voltage source for driving the sun roof, the delta connection of the stator coils, in which enough driving torque can be gained even if thickness of the coil wires is thinner than that of the stator coils connected as the star connection, is employed so as to reduce the size of the motor and maintain required torque. Note that, if the install space is large enough, the stator coils of the 3-phase DC brushless motor may be connected as the star connection.

Figure 6:
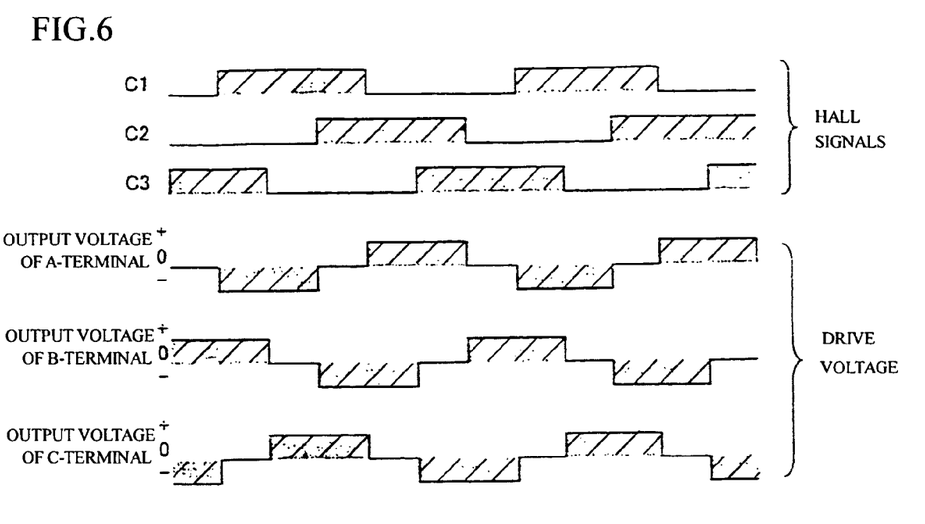
FIG. 6 is timing charts of detection signals of 3-phase pulses of magnetic sensors and switching (driving) signals sent to each phase of the stator coils.

Next, the phase switching action of the 3-phase DC brushless motor will be explained with reference to timing charts of FIG. 6. Charts C1-C3 in an upper part indicate detection signals (hall signals) outputted from the magnetic sensors (hall sensors) 32. Charts in a lower part indicate drive voltages outputted from the motor drive unit 9 to the A-terminal, B-terminal and C-terminal, which are shown in FIG. 5B and which are mutually shifted electric angles of 120 degrees. Phase change is performed on the basis of the outputs of the magnetic sensors 32 so as to apply drive voltage from the motor drive unit 9 to the stator coil 30 of the prescribed phase (see FIG. 1). For example, when the outputs of the magnetic sensors 32 are C1=Low, C2=Low and C3=High, the phase change is performed to run the electric current from the B-terminal to the A-terminal.

Figure 7:
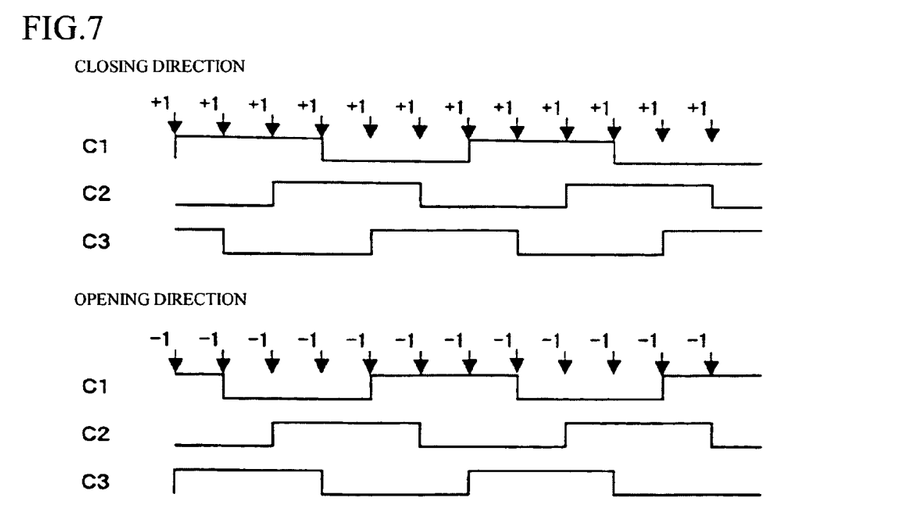
FIG. 7 is an explanation view of detecting positions and moving directions of a roof by detecting edges of the detection signals of 3-phase pulses of the magnetic sensors.

Next, a method of detecting positions of the roof 13 with the CPU 4 will be explained with reference to timing charts of FIG. 7, which show detection signals of the magnetic sensors. In the present embodiment, the 4-pole motor is employed, so each of the magnetic sensors 32 outputs 2 pulses per rotation, and the pulses of the three phases are outputted with the phase shift of 120 electric degrees (electric angle of 360 degrees=mechanic angle of 180 degrees in the motor of the present embodiment).

By counting rising edges and trailing edges of pulses of the 3-phase detection pulses outputted from the magnetic sensors 32, Counting 12 per rotation is used as data of the roof position. When the roof is moved in the closing direction, the count is +1; when the roof is moved in the opening direction, the count is −1. The moving direction of the roof is detected on the basis of differences of phase advancing order of the signals. For example, when C2=Low and C3=High, if a rising edge of the C1 is detected, the moving direction is deemed to be the closing direction, so the count is +1; if a trailing edge of the C1 is detected, the moving direction is deemed to be the opening direction, so the count is −1.

When C2=High and C3=Low, if the trailing edge of the C1 is detected, the moving direction is deemed to be the closing direction, so the count is +1; if the rising edge of the C1 is detected, the moving direction is deemed to be the opening direction, so the count is −1. Note that, if high resolution is not required, the detection pulses of two phases out of the three phases may be used.

Since the CPU 4 counts the rising edges and the trailing edges of the detection pulses of the three phases outputted from the magnetic sensors 32, resolution of the sensors can be improved, and miscount caused by reciprocating actions (e.g., chattering, cogging) which are performed when the magnetic poles are changed, instantaneous noises, etc. can be prevented.

Figure 8:
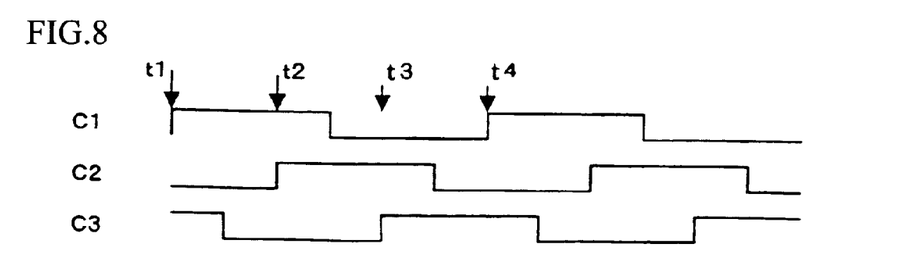
FIG. 8 is an explanation view of detecting a speed of the roof on the basis of the detection signals of 3-phase pulses of the magnetic sensors.

Next, a method of detecting a speed of the roof 13 by the CPU 4 will be explained with reference to timing charts of output signals of the magnetic sensors shown in FIG. 8. To control the speed, the speed is measured on the basis of cycle times of the detection pulses of the magnetic sensors 32. To measure a time length between the rising edges of the pulses of each phase, which are outputted from the magnetic sensors 32, the time length between the edges is T=t2−t1, and the speed is the inverse number thereof. Concretely, in case of the 4-pole motor, 3-phase output signals of 2 pulses per rotation are outputted with the phase shift of 120 electric degrees, and an electric angle between from t1 to t2 is 120 degrees and a mechanic angle therebetween is 60 degrees, so a rotational angle is $\pi/3$ [rad]. In this case, an angular speed V [rad/sec] can be found by a formula of V=$(\pi/3)/(t2-t1)$. Note that, the roof speed may be gained by other methods, e.g., calculating the roof speed on the basis of number of the detection pulses per unit time, further, the above described method of measuring the time length between the pulse edges may be combined with the method of calculating the roof speed on the basis of number of the detection pulses.

Figure 1:
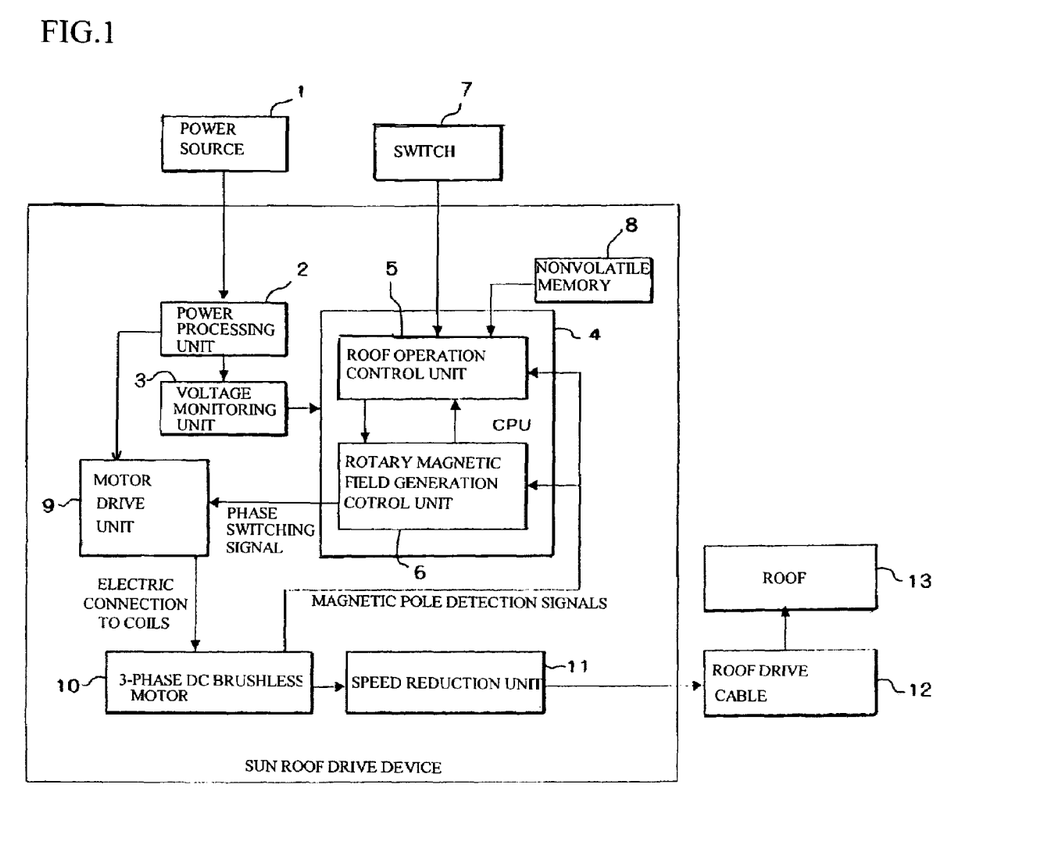
FIG. 1 is a block diagram of a sun roof drive device.
Figure 9:
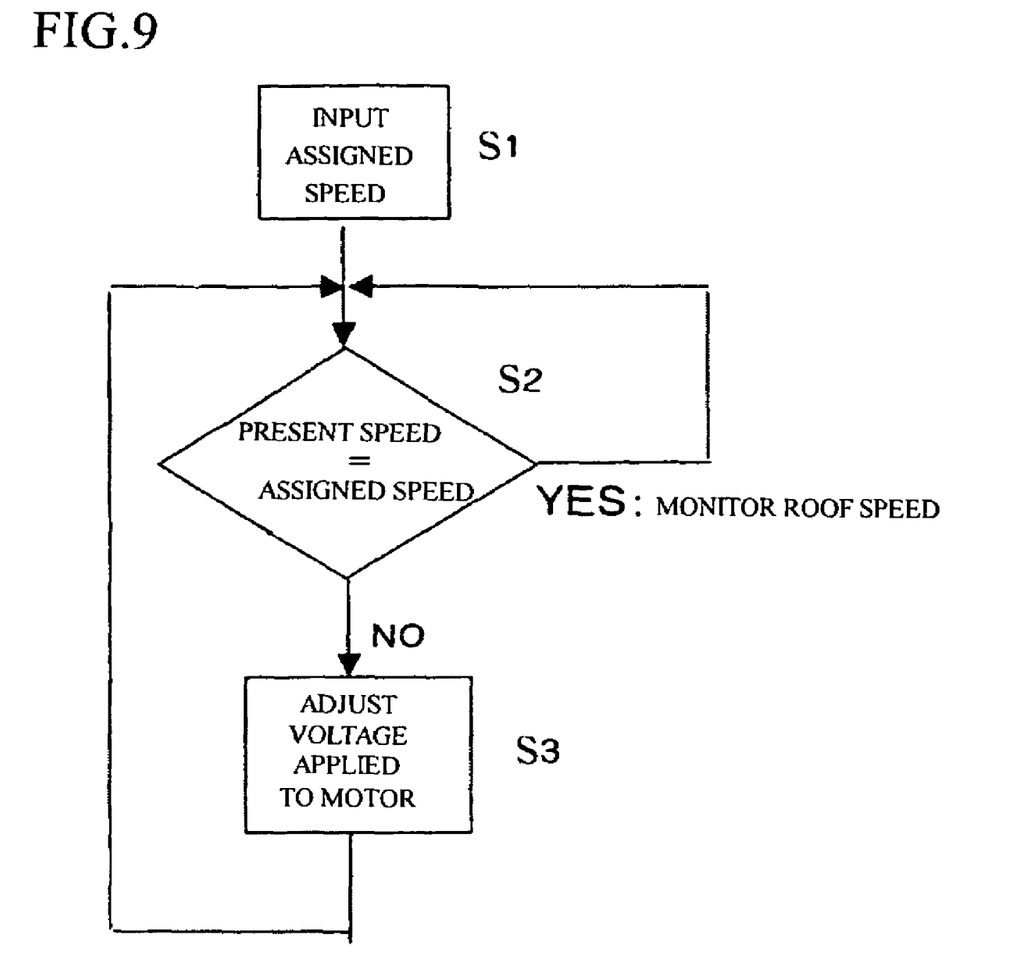
FIG. 9 is a flow chart for moving the roof at a constant speed.

In FIG. 1, the roof operation control unit 5 performs calculation so as to monitor the roof speed and sends a command to the rotary magnetic field generation control unit 6 so as to vary the rotation number of the motor (drive voltage of the motor) as needed when the roof speed varies. When the roof speed is controlled, jamming is also detected. As shown in a flow chart of FIG. 9, which shows the steps of the roof speed control, firstly an assigned speed is previously inputted (Step S1), and the roof operation control unit 5 calculates the present roof speed on the basis of the 3-phase pulse signals detected from the magnetic sensors 32 and compares the present roof speed with the assigned speed (Step S2). If the present speed is equal to the assigned speed, the roof speed is continuously monitored; if the present speed is different from the assigned speed, the drive voltage applied from the motor drive unit 9 is varied or adjusted by the rotary magnetic field generation control unit 6 (Step S3). With this action, the roof speed can be controlled to maintain the assigned speed. By varying the assigned speed, the roof speed can be controlled. For example, when the roof is tilted or the roof contacts a stopper, the roof speed may be reduced, namely the roof can be moved at optimum speed.

While controlling the roof speed, if increase (or decrease) of load is detected by monitoring the roof speed, the roof speed is reduced (increased), the drive voltage of the motor is increased (decreased). With this control, amount of the current passing through the stator coils is increased (decreased) until torque corresponds to the load. The drive voltage of the motor correlates to the load, so if the load exceed a prescribed value, the control unit judges occurrence of jamming, then the motor (roof) is stopped and slightly moved in the opening direction.

The CPU 4 performs the phase change of the 3-phase stator coils 30 on the basis of the detection signals of the magnetic sensors 32, which are typically provided to the DC brushless motor 10, and the CPU 4 calculates to detect the roof positions, the roof speed and the occurrence of jamming, so that independent sensors and encoders can be omitted, number of parts can be reduced, the control circuit can be simplified and the device can be downsized.

The brushless structure is capable of reducing noises, further a sinusoidal wave current or pseudo-sinusoidal wave current may be applied to the stator coils 30 so as to restrain torque ripples of the motor, reduce the rotational vibrations and further reduce noises. Concretely, the motor drive unit 9 applies rectangular waves to the stator coils when high torque is required at a low rotational speed so as to start and stop the motor; the motor drive unit applies sinusoidal waves or pseudo-sinusoidal waves to the stator coils when low noise is required. Further, if the rotor magnet 38 is skew-magnetized or sinusoidal-magnetized in radial directions, torque ripples and cogging torque of the motor can be reduced so that rotational vibrations can be reduced, so noises can be further reduced by further employing the method of applying sinusoidal waves or pseudo-sinusoidal waves to the stator coils 30.

Figure 10:
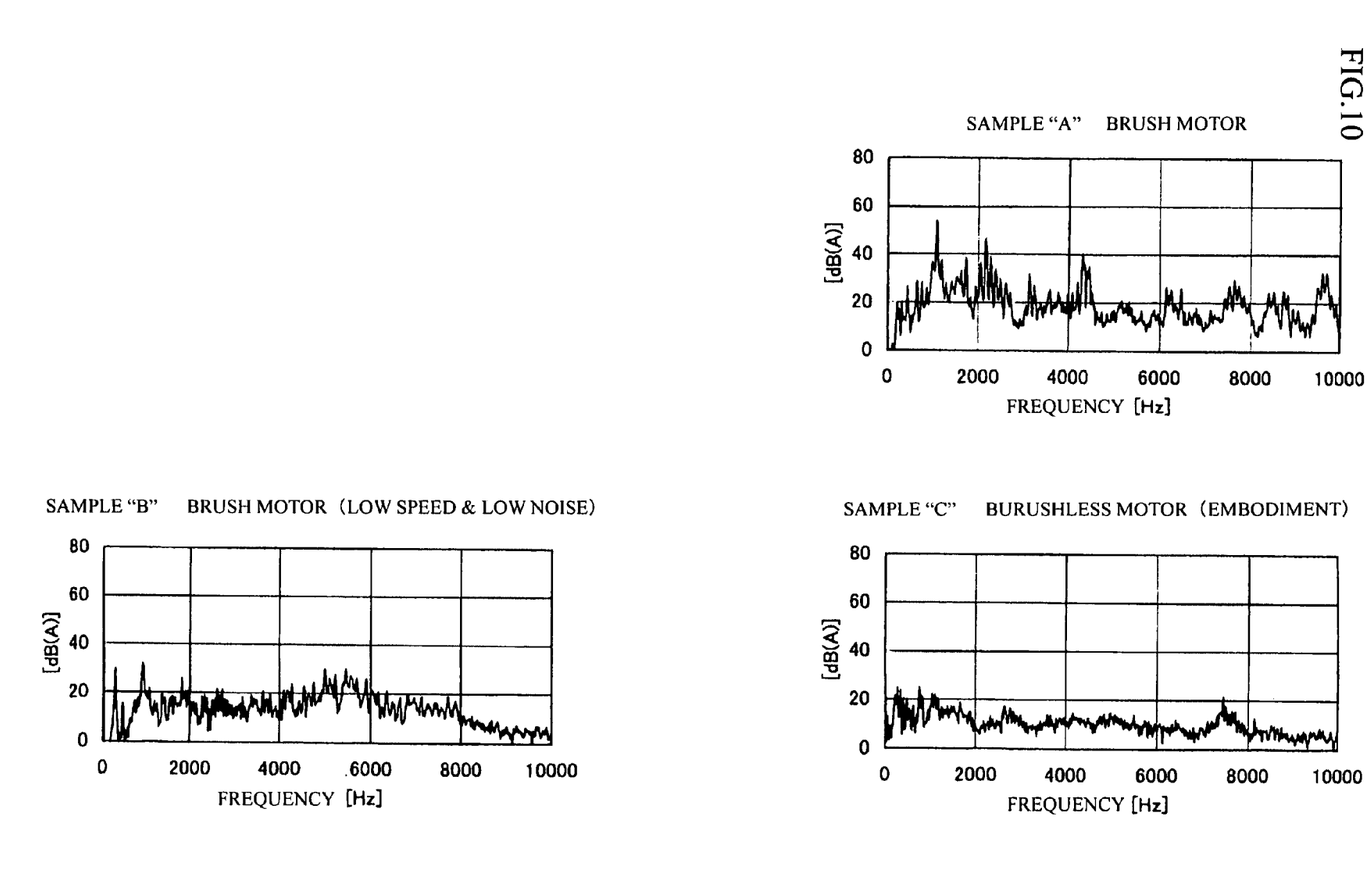
FIG. 10 is graphs of frequency-analyzed data of noise level of motors during operation.

Results of frequency-analyzing noise level are shown in FIG. 10, wherein samples were a DC brush motor (sample A), a low noise DC brush motor (sample B) and the DC brushless motor (sample C; used in the present embodiment), to each of which fixed source voltage (DC 13.5V) was applied and each of which was rotated in the counter clockwise (CCW) direction with rated voltage and fixed load. The noise levels were measured at measuring points, each of which was separated 30 cm away from the motor case 14. Noise level of the DC brushless motor of the sample C, which is used in the present embodiment, was lower than those of the samples A and B, further it could be operated with low noise in a wide frequency range (about 1 KHz-7.5 KHz).

In the above described embodiment, the sun roof drive device has the roof drive cable as the push-pull means, but the present invention may be applied to a sun roof drive device having a plastic belt. The sun roof drive device of the above described embodiment opens and closes the opening of the fixed roof, further the sun roof drive device may be used as a sunshade drive device, which opens and closed a sunshade without opening the fixed roof.

The invention claimed is:

1. A sun roof drive device for opening and closing a vehicle sun roof, comprising:
   a DC brushless motor acting as a drive source;
   a motor drive unit for switching drive voltage, which is applied to stator coils on the basis of a rotational position of a rotor detected by a magnetic sensor for detecting pole positions of a rotor magnet;
   a control unit controlling the opening and closing actions of the vehicle sun roof, with said motor drive unit, on the basis of a detection signal of the magnetic sensor; and
   a push-pull mechanism pushing and pulling a push-pull means, which is linked with said DC brushless motor by a speed reduction unit,
   wherein a position of the vehicle sun roof is detected on the basis of detection signals of the magnetic sensor, which correspond to three or two of three phases, and said control unit performs arithmetic processing so as to control the position and a speed of the vehicle sun roof on the basis of a count signal, which is generated by counting rising edges and trailing edges of pulses of the pole detection signals.

2. The sun roof drive device according to claim 1, wherein the stator coils, which are respectively wound on stator teeth, are connected as 3-phase delta connection.

3. The sun roof drive device according to claim 1, wherein said motor drive unit applies sinusoidal waves or pseudo-sinusoidal waves to the stator coils.

4. The sun roof drive device according to claim 1, wherein said motor drive unit drives the motor by rectangular waves when high torque is required at a low rotational speed in order to reduce noise and drives the same by sinusoidal waves or pseudo-sinusoidal waves when low noise is required.

5. The sun roof drive device according to claim 1, wherein said control unit detects jamming of the vehicle sun roof by controlling a speed of the vehicle sun roof.

6. The sun roof drive device according to claim 1, wherein said control unit controls the action of the vehicle sun roof and generation of rotary magnetic fields of said motor by one CPU.

7. The sun roof drive device according to claim 1, wherein said DC brushless motor is an inner rotor type motor, in which a motor shaft having the rotor magnet is capable of rotating in a space enclosed by a stator core, in which the stator coils are respectively wound on stator pole sections.

8. The sun roof drive device according to claim 1, wherein the rotor magnet is skew-magnetized or sinusoidal-magnetized in radial directions.

* * * * *